Dec. 22, 1936.  H. K. JENKINS  2,065,459
SERVICE AND EMERGENCY BRAKE CONTROL
Filed Feb. 4, 1936
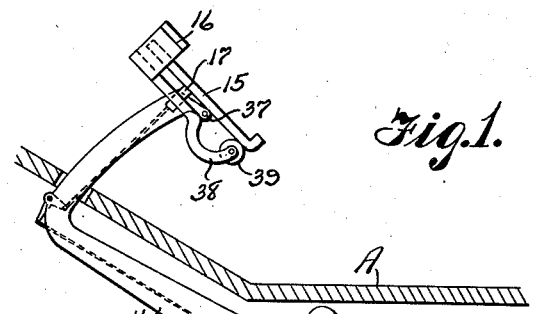
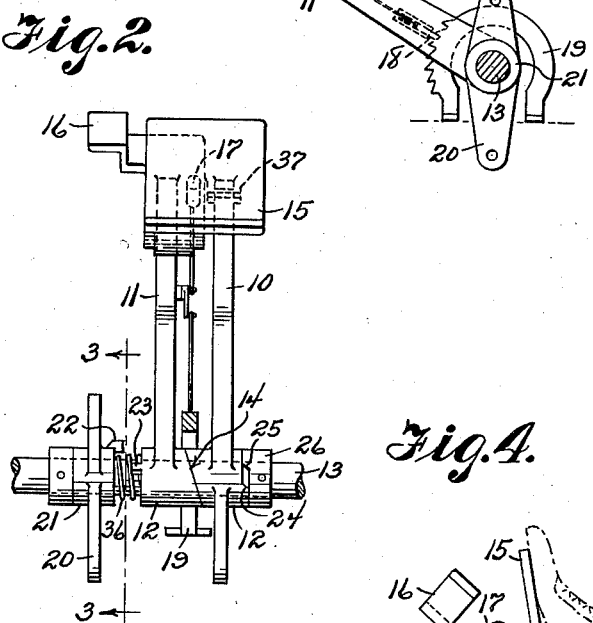
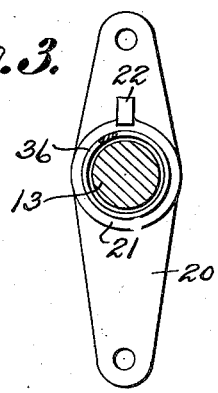
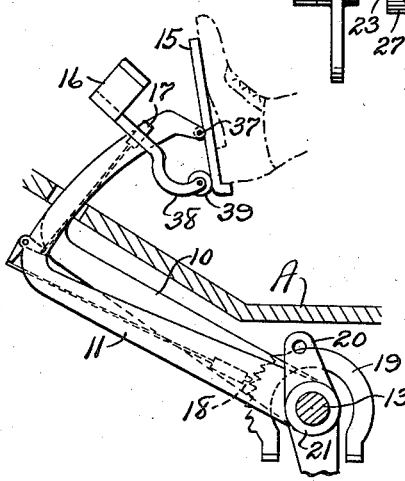
Henry K. Jenkins
INVENTOR
BY Victor J. Evans & Co.
ATTORNEY Patented Dec. 22, 1936

2,065,459

UNITED STATES PATENT OFFICE 2,065,459

SERVICE AND EMERGENCY BRAKE CONTROL

Henry K. Jenkins, Andover, Mass.

Application February 4, 1936, Serial No. 62,370

2 Claims. (Cl. 74—478)

The invention relates to a brake control for motor vehicles and more especially to service and emergency brake controls.

The primary object of the invention is the provision of a control of this character, wherein the service brake pedal is operatively associated with an emergency brake pedal so that these can be operated independently of each other or when operating the service brake pedal the same should fail in applying the service brake the emergency brake will be automatically applied, thus under ordinary conditions of operation of the motor vehicle the service and emergency brakes work independently of each other, but in case of the failure of the service brake the emergency brakes by a continued motion upon the service brake pedal the same will be automatically applied and thereby assuring control of the vehicle.

Another object of the invention is the provision of a control of this character, wherein through the use of foot pedals both the service and emergency brakes can be regulated and controlled by the foot of an operator and thereby eliminating hand manipulation of an emergency brake as is usual in motor vehicles, both character of brakes of such vehicle being automatically applied through the use of one foot of an operator of the vehicle.

A further object of the invention is the provision of a control of this character, wherein the necessity for any material change or alteration in the braking equipment of standard makes of motor vehicles is entirely avoided and the brakes of such vehicle both for the service thereof in ordinary driving and during emergency can be automatically applied in a single operation by the use of one foot of an operator of the vehicle, the hands of the operator being free for other duties in the manipulation of the vehicle and also the other foot at liberty for control of a clutch of the vehicle.

A still further object of the invention is the provision of a control of this character, wherein the construction thereof adapts the same for mechanical and fluid brakes, such as air or hydraulic brakes of a motor vehicle and in the failure of the service brakes of the vehicle the emergency brakes become operative, the control being readily operated and is foot actuated.

A still further object of the invention is the provision of a control of this character, which is simple in construction, thoroughly reliable and effective in its operation, readily and easily applied to a motor vehicle, positive of action, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary vertical sectional view through a motor vehicle showing the brake control constructed in accordance with the invention associated therewith.

Figure 2 is to top plan view.

Figure 3 is a sectional view on the line 3—3 of Figure 2 looking in the direction of the arrows.

Figure 4 is a view similar to Figure 1 showing the brake control operated from its normal position in Figure 1.

Figure 5 is a view similar to Figure 2 showing a modification and being partly in section.

Similar reference characters indicate corresponding parts throughout the several views in the drawing.

Referring to the drawing in detail, particularly Figures 1 to 4 inclusive, the brake control comprises a service brake pedal 10 and an emergency brake pedal 11, respectively, these being arranged side by side and are formed with bearing hubs 12 loose upon a supporting shaft 13 which is suitably fitted within a motor vehicle. The hubs 12 next to each other are formed with the cams 14 so that on the movement of the pedal 10 the pedal 11 will be shifted upon the shaft 13 for a purpose presently described.

The pedal 10 at its upper end has a swinging foot stirrup 15 while the pedal 11 at its upper end has a fixed foot stirrup 16, a portion of the latter being in underlying relation to the stirrup 15 of the pedal 10. Working through the stirrup 16 is a foot actuated button 17 having connection with a spring operated latching bolt 18 for cooperation in ratchet action with a toothed keeper segment 19 stationarily mounted and about the shaft 13 between the pedals 10 and 11 so that on swinging the stirrup 15 the same will engage with the button 17 for depressing it to release the bolt 18 from the keeper 19 and thus freeing the pedal 11 for swinging movement in reverse direction. When pressure is relieved from the button 17 the bolt 18 will latch the pedal 11 and such latching of the pedal will occur during the downward movement thereof under foot pressure on the same.

The pedal 10 has suitable rigging or linkage with service brakes (not shown) either of the hydraulic or mechanical kind while loose upon the shaft 13 is a rocking lever 20 having its hub 21 provided with an abutment lug or clutch ear 22 while on the hub 12 of the pedal 11 next to the said hub 21 is a companion abutment lug or clutch ear 23 so that when the cams 14 coact with each other on depressing the emergency pedal 11 it will become automatically locked with the lever 20 for actuating the same and this lever has linkage connection with the emergency brakes (not shown) of the motor vehicle so that the emergency brakes under actuation of the pedal 11 can be applied.

The hub 12 of the pedal 10 is formed with a cam 24 next to a cam 25 of a collar 26, the latter being fixed to the shaft 13 next to the pedal 10 and these cams 24 and 25 cooperate with each other for the purpose that when the service brakes fail to be applied on operating the pedal 10 through the lowering of the latter for braking operation the pedal 11 will be automatically moved into a position to clutch with the lever 20 so that the emergency brakes will apply through further downward pressure of the service pedal 10. Therefore, it will be readily seen from the foregoing that in event of the failure of the application of the service brakes the emergency brakes will be automatically applied and under ordinary conditions the service brakes can be applied independently of the emergency brakes and vice versa. The hand lever of the ordinary equipment in standard makes of automobiles is entirely eliminated in the use of the brake control hereinbefore set forth and the emergency pedal 11 can be operated by the foot of a driver of the vehicle for braking purposes particularly in parking the vehicle and likewise the foot of the driver will operate the service brake, it being noted that but one foot is required in operating both the service and emergency pedals either individually or collectively.

In Figure 5 of the drawing there is shown a slight modification wherein the hub 27 of the emergency brake pedal 28 has worm screw connection 29 with the hub 30 of the service pedal 31, this being a substitute for the cams 14 so that the pedal 28 will clutch with the lever 32 which is identical to the lever 20 hereinbefore described. The hub 30 of the pedal 31 is formed with a cam slot 33 in which plays a pin 34 fixed in the shaft 35 and this slot 33 and pin 34 being a substitute for the cams 24 and 25 hereinbefore described.

Surrounding the shaft 13 between the hub 12 of the pedal 11 and the lever 20 is a coiled tensioning spring 36 which maintains the cams 14 in contacting or working relation to each other throughout the working of the pedals 10 and 11 and also the cams 24 and 25 in operative relation to one another.

The stirrup 15 is pivoted at 37 to the pedal 10 while the stirrup 16 at its heel end 38 carries a roller 39 with which contacts the heel end of the stirrup 15 when the latter is pressed upon by the foot at its heel end to move the pedal 11 downwardly without operating the button 17 for the release of the bolt 18 from the keeper 19.

What is claimed is:

1. In a control of the character described a pair of pedals, one being adapted for operation of service brakes and the other for operation of emergency brakes of a motor vehicle, foot stirrups carried by said pedals, the foot stirrup of the service brake pedal being overlapped with relation to the stirrup of the emergency brake pedal, means swingingly connecting the stirrup for the service brake pedal therewith, the stirrup for the emergency brake pedal being fixed, a rack between the pedals, means controlled by the stirrup of the service brake pedal for the latching of the emergency brake pedal with said rack, and means regulated by the service brake pedal for effecting the operation of the emergency brake pedal to actuate the emergency brake in advance of the application of the service brakes when operated by the service brake pedal.

2. In a control of the character described a pair of pedals, one being adapted for operation of service brakes and the other for operation of emergency brakes of a motor vehicle, foot stirrups carried by said pedals, the foot stirrup of the service brake pedal being overlapped with relation to the stirrup of the emergency brake pedal, means swingingly connecting the stirrup for the service brake pedal therewith, the stirrup for the emergency brake pedal being fixed, a rack between the pedals, means controlled by the stirrup of the service brake pedal for the latching of the emergency brake pedal with said rack, and means regulated by the service brake pedal for effecting the operation of the emergency brake pedal to actuate the emergency brake in advance of the application of the service brakes when operated by the service brake pedal, the said pedals being selectively and collectively operable by a single foot at the stirrups thereof.

HENRY K. JENKINS.